United States Patent
Liebling

(10) Patent No.: US 8,495,083 B2
(45) Date of Patent: Jul. 23, 2013

(54) GENERATION AND RETRIEVAL OF INCIDENT REPORTS

(75) Inventor: Daniel J. Liebling, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 12/341,090

(22) Filed: Dec. 22, 2008

(65) Prior Publication Data

US 2009/0106359 A1    Apr. 23, 2009

Related U.S. Application Data

(62) Division of application No. 11/039,253, filed on Jan. 19, 2005, now Pat. No. 7,478,095.

(51) Int. Cl.
*G06F 17/30*    (2006.01)

(52) U.S. Cl.
USPC ..................................................... 707/769

(58) Field of Classification Search
USPC ................. 707/708–718, 758–772, 779, 780
See application file for complete search history.

(56) References Cited

U.S. PATENT DOCUMENTS

| | | | | |
|---|---|---|---|---|
| 5,850,446 | A * | 12/1998 | Berger et al. | 705/79 |
| 5,974,441 | A * | 10/1999 | Rogers et al. | 709/200 |
| 6,026,379 | A * | 2/2000 | Haller et al. | 705/34 |
| 6,738,798 | B1 | 5/2004 | Ploetz et al. | |
| 6,952,695 | B1 * | 10/2005 | Trinks et al. | 1/1 |
| 2002/0124182 | A1 * | 9/2002 | Bacso et al. | 713/200 |
| 2003/0237035 | A1 * | 12/2003 | Bowers et al. | 714/724 |
| 2004/0078721 | A1 * | 4/2004 | Williams | 714/46 |
| 2004/0252348 | A1 | 12/2004 | Desai | |
| 2005/0081108 | A1 * | 4/2005 | Shabalin | 714/38 |
| 2005/0159275 | A1 | 7/2005 | Bullman et al. | |
| 2006/0070037 | A1 | 3/2006 | Canning et al. | |

OTHER PUBLICATIONS

Microsoft Dictionary, Microsoft Press, 5th edition, pp. 125-126, 2002.*

* cited by examiner

*Primary Examiner* — Wilson Lee
(74) *Attorney, Agent, or Firm* — Lee & Hayes, PLLC

(57) ABSTRACT

Upon detection of an anomaly, a report is generated that includes a description the anomaly. A description of the anomaly contained in the report is examined to determine a proposed remedy for the anomaly.

18 Claims, 5 Drawing Sheets

GENERATION AND RETRIEVAL OF INCIDENT REPORTS

RELATED APPLICATION

This application is a divisional of, and claims priority to, U.S. patent application Ser. No. 11/039,253, filed on Jan. 19, 2005, the disclosure of which is incorporated in its entirety by reference herein.

BACKGROUND

Users have access to wide variety of content over a network. For example, a user may access web site over the Internet to obtain stock quotes, read news articles, obtain a weather forecast, read email, respond to instant messages, and so on. Additionally, the user may have a variety of different choices for accessing a particular variety of content, such as a wide variety of different web sites which provide news articles.

Because of this wide variety of choices, the user's ease of interaction with the differing web sites may be a determining factor of which web site the user will choose to frequent. For example, during an attempt to interact with a banking web site, the user may encounter an incident which affects the user's interaction with the banking web site. Therefore, the user may contact a customer service representative of the web site to remedy the incident. The customer service representative, however, may need to rely on information provided by the user which describes how the incident occurred, which requires additional time and effort by the user to provide information. Additionally, the information provided is dependent on the user's ability to recall the steps which preceded and/or followed the incident. Consequently, the customer service representative may be unable to remedy the incident based on limitations of the information provided, which may also result in additional user frustration and even a decision by the user to utilize another banking web site, which results in lost revenue to a provider of the banking web site.

Therefore, there is a continuing need for techniques for generation and retrieval of incident reports.

SUMMARY

Generation and retrieval of a report which describes an incident encountered during attempted user interaction with content over a network is described. In an implementation, a method includes monitoring user interaction with content over a network. When an incident is detected from the monitoring, a report is generated which includes a description of the incident and a report identifier (ID) for communication to the user and for retrieval of the report.

In another implementation, a method includes receiving a report identifier (ID) that is configured for communication over a network from a user. The report ID was obtained by the user in response to an incident which affected the user's interaction with content over a network. The received report ID is utilized to retrieve one or more of a plurality of reports that include a description of the user's interaction with the content that caused the incident and possible remedies.

BRIEF DESCRIPTION OF THE DRAWINGS

The same reference numbers are utilized in instances in the discussion to reference like structures and components.

DETAILED DESCRIPTION

Overview

Generation and retrieval of reports which describe one or more incidents encountered during attempted user interaction with content are described. For example, a system may be configured to monitor user interaction with a web site to detect whether an incident has occurred, such as an event that is not part of the standard operation of the web site which may interfere with the user's interaction with the web site. In response to this detection, a report may be automatically generated which describes the monitored interaction and includes a report identifier (ID). The report ID is stored with the report and is communicated to the user. Therefore, the user may contact a customer service representative and supply the report ID, which may then be utilized by the customer service representative to retrieve the report. Thus, in this example, the customer support representative is provided with detailed information, retrieved via the report ID, which describes the user's attempted interaction with the web site. Further, this detailed information in this example is provided without reliance on the user's ability to recollect and communicate the information and also saves the user the time and effort in providing this information.

In another example, the report may be utilized to provide a proposed remedy to the incident. For instance, the description of the incident contained in the report may be compared with a plurality of possible remedies that are searchable based on the description of the incident contained in the report. Therefore, the description may be utilized to obtain a proposed remedy that may be communicated to the user, either directly or indirectly through the customer service representative. In another instance, the proposed remedy may be utilized to obtain additional information from the user. For example, the proposed remedy may be a "starting point" for communication between the customer service representative and the user in an attempt to remedy the incident, such as by leading the user and/or the representative toward an eventual remedy to the incident. Further discussion of selection and communication of a proposed remedy may be found in relation to FIG. 4.

Exemplary Environment

Figure 1:
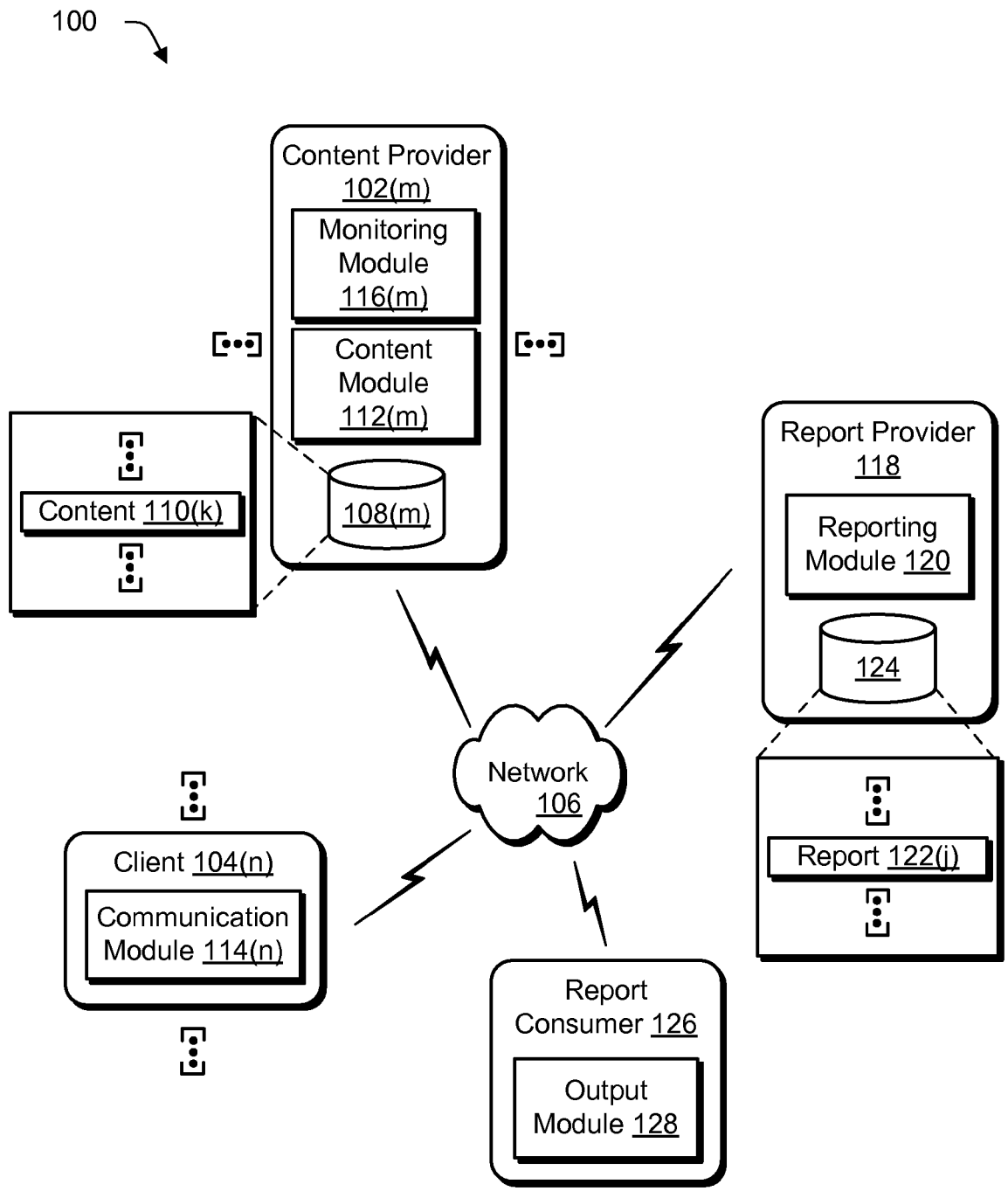
FIG. 1 is an illustration of an environment in an exemplary implementation that is operable to generate and retrieve reports which describe an incident encountered during attempted user interaction with content over a network.

FIG. 1 is an illustration of an environment 100 in an exemplary implementation that is operable to generate and retrieve reports which describe an incident encountered during attempted user interaction with content over a network. The illustrated environment 100 includes a plurality of content providers 102(*m*), where "m" can be any integer from one to "M", and a plurality of clients 104(*n*), where "n" can be any integer from one to "N", which are communicatively coupled, one to another, over a network 106. The clients 104(*n*) may be configured in a variety of ways. For example, one or more of the clients 104(*n*) may be configured as a computing device that is capable of communicating over the network 106, such as a desktop computer, a mobile station, an entertainment appliance, a set-top box communicatively coupled to a display device, a wireless phone, a game console, and so forth. Thus, the clients 104(*n*) may range from full resource devices with substantial memory and processor resources (e.g., personal computers, game consoles) to a low-resource device with limited memory and/or processing resources (e.g., traditional set-top boxes, hand-held game consoles). The clients 104(*n*) may also relate to a person and/or entity that operate the clients. In other words, clients 104(*n*) may describe logical clients that include users and/or computing devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, the network 106 may be configured from a combination of a corporate intranet, a public telephone network, a satellite network, and a wireless wide area network (WAN). A wide variety of other instances are also contemplated.

The content provider 102(*m*) is illustrated as including a database 108(*m*) which stores a plurality of content 110(*k*), where "k" can be any integer from one to "K". The content 110(*k*) may be configured in a variety of ways. For example, the content 110(*k*) may be configured as a web page, an instant message, an email, audio content (e.g., a downloadable song), video content (e.g., a video-on-demand), a voice mail message, a meeting request, a software update, a result of remote application processing, and so on. To manage the provision of the content 110(*k*) over the network 106, the content provider 102(*m*) may include a content module 112(*m*). For example, the content module 112(*m*) may be executable to provide digital rights management of the content 110(*k*), process requests from the clients 104(*n*) for accessing the content 110(*k*), manage storage of the content 110(*k*) in the database 108(*m*), communicate (e.g., stream) the content 110(*k*) over the network 106, and so on.

The client 104(*n*) is illustrated as including a communication module 114(*n*) which is executable to provide access to the network 106. For example, the communication module 114(*n*) may be configured as a web browser to request one or more of the plurality of content 110(*k*) configured as a web page. In response to the request, the content module 112(*m*) is executed by the content provider 102(*m*) to provide the content 110(*k*) (e.g., the web page) over the network 106. During this interaction between the client 104(*n*) with the content 110(*k*), however, an incident may be encountered which affects the client's interaction with the content, e.g., retrieval of the web page. For instance, the incident may be caused by a hardware, software, and/or network error which results in a reduction in or interruption of the client's 104(*n*) ability to retrieve the web page.

Accordingly, the content provider 102(*m*) in the environment 100 of FIG. 1 includes a monitoring module 116(*m*) in order to collect information which describes the incident. For example, the monitoring module 116(*m*) is executable to monitor the client's 104(*n*) interaction with the content 110(*k*) and store data which describes this interaction. Data monitored and stored by the monitoring module 116(*m*) may include logging client 104(*n*) requests, a description of the content 110(*k*) requested, a result of the request (e.g., successive, not successful, a value resulting from processing the request, and so on), which device or devices processed the request, and so forth. Data obtained by the monitoring module 116(*m*) may then be communicated to a report provider 118.

The report provider 118 is illustrated in the environment 100 of FIG. 1 as communicatively coupled to the content provider 102(*m*) over the network 106. The report provider 118 includes a reporting module 120 which is executable to generate one or more reports 122(*j*), where "j" can be any integer from one to "J". For example, the reporting module 120 may be executed to generate the report 122(*j*) from data obtained from the monitoring module 116(*m*). The report 122(*j*) is then stored in a database 124 for later retrieval.

A report consumer 126, for instance, may retrieve the report 122(*j*) via the network 106. The report consumer 126 may be configured in a variety of ways. For example, the report consumer 126 may be configured as a part of a customer service system that executes an output module 128 to retrieve the report 122(*j*) from the report provider 118, e.g., directly through communication with the database 124, indirectly through communication with the reporting module 120, and so on. Upon retrieval of the report 122(*j*), the output module 128 may output the report 122(*j*) such that a consumer (e.g., the client 104(*n*), a customer service representative, and so on) may obtain a description of the incident which affected the client's 104(*n*) interaction with the content 110(*k*). This description of the incident may be utilized in a variety of ways, such as to find a remedy for the incident, further discussion of which may be found in relation to FIGS. 4 and 5.

It should be noted that although the communication module 114(*n*) in the previous example was described as a web browser, the communication module 114(*n*) may be configured in a wide variety of ways to support communication over the network 106. For example, the communication module 114(*n*) may be configured to support email, instant messages, voice mail, and so on. Additionally, it should also be noted that the terms "report provider" 118 and "report consumer" 126 describe a relationship of the respective entities to the report 122(*j*), which was generated by information obtained from the monitoring module 116(*m*). Therefore, the functionality represented by the report provider 118 and the report consumer 126 may be configured and arranged in the environment 100 in a variety of ways. For example, in another implementation the content provider 102(*m*) may include the functionality represented by the report provider (e.g., to generate and distribute reports) and the client 104(*n*) may correspond to the report consumer 126 (e.g., the client 104(*n*) and the report consumer 126 are implemented by the same computing device), such as to receive reports from the content provider 102(*m*). In another example, the monitoring module 116(*m*) and the reporting module 120 are both executed by a stand-alone system that is physically separate from the content provider 102(*m*) but is communicatively coupled via a network. A wide variety of other examples are also contemplated.

Generally, any of the functions described herein can be implemented using software, firmware, fixed logic circuitry, manual processing, or a combination of these implementations. The terms "module" and "functionality," and "logic" as used herein generally represent software, firmware, or a combination of software and firmware. In the case of a software implementation, the module, functionality, or logic represents program code that performs specified tasks when executed on one or more processors (e.g., CPU or CPUs). The program code can be stored in one or more computer readable memory devices, further description of which may be found in relation to FIG. 2. The features of the reporting techniques described below are platform-independent, meaning that the techniques may be implemented on a variety of commercial computing platforms having a variety of processors.

Figure 2:
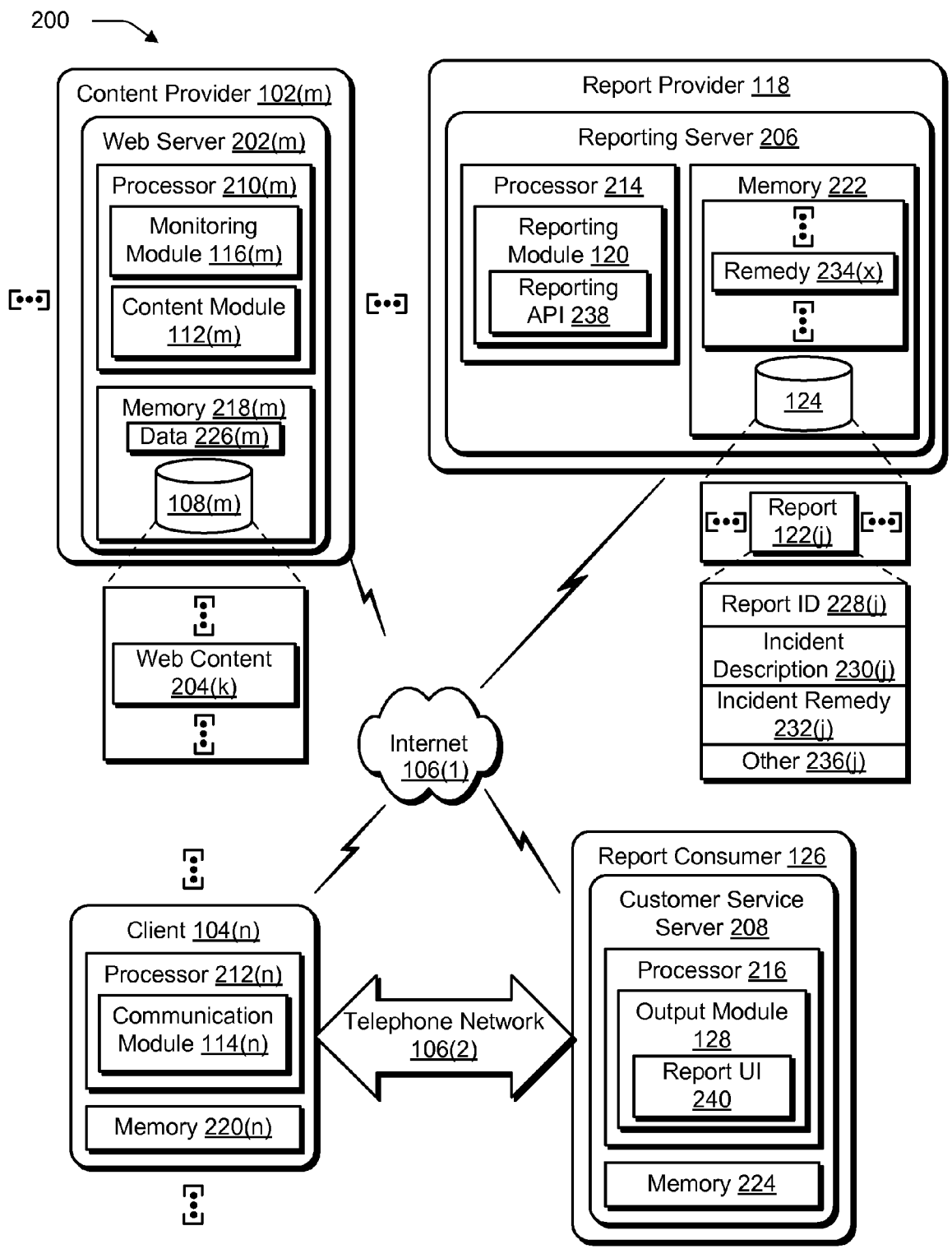
FIG. 2 is an illustration of a system in an exemplary implementation showing a content provider, a client, a report provider, and a report consumer of FIG. 1 in greater detail.

FIG. 2 is an illustration of a system 200 in an exemplary implementation showing the content provider 102(m), the client 104(n), the report provider 118, and the report consumer 126 of FIG. 1 in greater detail. The system 200 of FIG. 2 is representative of an exemplary network environment that is configured to implement the environment 100 of FIG. 1 through use of a variety of computing devices. For example, the content provider 102(m) is illustrated as including a web server 202(m) which is configured to provide web content 204(k) (e.g., web pages). In the illustrated implementation of FIG. 2, web content 204(k) corresponds at least in part to the content 10(k) of FIG. 1. The report provider 118 is illustrated as including a reporting server 206 for collecting information from the monitoring module 116(m). The report consumer 126 is illustrated as a customer service server 208 for inclusion as a part of a customer service system. The client 104(n) is illustrated as a client device. The web server 202(m), client 104(n), reporting server 206, and customer service server 208 are each illustrated as including a respective processor 210(m), 212(n), 214, 216 and a respective memory 218(m), 220(n), 222, 224.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth.

Additionally, although a single memory 218(m), 220(n), 222, 224 is shown, respectively, for the web server 202(m), client 104(n), reporting server 206, and customer service server 208, a wide variety of types and combinations of memory may be employed, such as random access memory (RAM), hard disk memory, removable medium memory, and so forth. For example, the monitoring module 116(m) and the content module 112(m) may be stored in RAM and executed on the processor 210(m) of the web server 202(m), and the database 108(m) may be implemented utilizing a hard disk drive, RAID array, and so on. Further, it should be noted that although modules are illustrated in the system 200 of FIG. 2 as being executed on a respective processor, the modules are also storable in a respective memory. For example, the communication module 114(n) is executable on the processor 212(n) of the client 104(n) and is storable in memory 220(n).

The system 200 is also illustrated as including multiple networks which may be considered portions of the network 106 of FIG. 1. For example, the system 200 may include an Internet 106(1) which is configured to communicatively couple the content provider 102(m), client 104(n), report provider 118, and the report consumer 126, one to another. The system 200 may also include a telephone network 106(2) to communicatively couple the client 104(n) with the customer service server 208. A wide variety of other configurations are also contemplated for the network 106 of FIG. 1 as previously described.

The communication module 114(n) is executable on the processor 212(n) to interact with the web content 204(k) over the internet 106(1). For example, the communication module 114(n) may be configured as a web browser which is configured for navigation through the web content 204(k).

The content module 112(m) is executable on the processor 210(m) and is also storable in memory 218(m) of the web server 202(m). The content module 112(m), when executed, supports interaction between the communication module 114(n) and the web content 204(k), such as to transmit a particular piece of web content 204(k) (e.g., a web page) over the Internet 106(1) to the client 104(n). Likewise, the monitoring module 116(m) is also executable on the processor 210(m) and is storable in the memory 218(m) of the web server 202(m). The monitoring module 116(m), when executed, is configured to monitor interaction by the client 104(n) with the web content 204(k) and store data 226(m) which describes this interaction in memory 218(m).

The reporting module 120 is executable on the processor 214 and is storable in memory 222 of the reporting server 206. The reporting module 120, when executed, collects the data 226(m) from the plurality of content providers 102(m) in response to an occurrence of an incident in the client's 104(n) interaction with the web content 204(k). The reporting module 120 is also executable to process the data 226(m) to generate a corresponding report 122(j). The report 122(j) may be generated in a variety of ways to reference the client's 104(n) interaction with the web content 204(k). For example, each of the plurality of reports 122(j) may include a corresponding report ID 228(j). The report ID 228(j) may be communicated to the client 104(n) for location of the particular report 122(j) which describes the client's 104(n) interaction from a plurality of other reports in the database 124.

Each of the plurality of reports 122(j) may also include an incident description 230(j) taken from the data 226(m) communicated from the content provider 102(m). For example, the reporting module 120 may process the data 226(m) to locate which characteristics, if any, are described by the data 226(m). A variety of characteristics may be utilized to describe an incident, such as time (e.g., when the incident occurred), location (e.g., network address, geographical location of the incident), failure type (e.g., whether the incident relates to a hardware, software, and/or network error), request (e.g., what content was requested), a corresponding result of the request (e.g., what data was to be provided as a result to the request), data describing content interaction performed by other clients that may have caused the incident (e.g., processing performed in response to a request from another one of the plurality of clients 104(n) which caused software and/or hardware failure of the web server 202(m)), and so on.

The reporting module 120 may also be executed to provide a reference to an incident remedy 232(j). For example, the reporting server 206 may include a plurality of remedies 234(x), where "x" can be any integer from one to "X". The reporting module 120 may select one of remedies 234(x) based on the data 226(m) and/or the incident description 230(j)) of the incident, for which, the report 122(j) was generated. The reference to the incident remedy 232(j) may include data describing the remedy 234(x) itself, a network address of where to find the remedy 234(x), and so on.

Although the report 122(j) was described as including a report ID 228(j), incident description 230(j), and incident remedy 232(j), the report 122(j) may be configured in a variety of ways. For example, the report 122(j) may be configured to include a report ID 228(j) and incident description 230(j) but not an incident remedy 232(j). In another example, the report 122(j) may include other 236(j) data, such as a location at which additional processing may be performed utilizing the incident description 230(j) to arrive at another incident remedy, where the report 122(j) is to be communicated (e.g., a network address of the report consumer 126, for which, the report 122(j) was generated), and so on.

The reporting module 120 is also illustrated as including a reporting application programming interface (API) 238. The reporting API 238 may be configured to provide a variety of functionality. For example, the reporting API 238 may be utilized to provide programmatic access to the reports 122(j) and/or the reporting module 120 to other modules such that the other modules do not have to know the "details" of how the processing of the reporting module 120 is performed. In another example, the reporting API 238 may be configured to provide access to computing devices which are not compatible, one with another.

As previously described, the report consumer 126 in the system 200 of FIG. 2 is illustrated as including a customer service server 208. The output module 128 is executable on the processor 216 and is storable in memory 224 of the customer service server 208. The output module 128, when executed, may obtain the report 122(j) via the reporting API 238 of the reporting module 120. The report 122(j) may be obtained by the customer service server 208 for a variety of purposes.

The customer service server 208, for example, may be part of a customer service system that is accessible by a customer service representative. The client 104(n) may contact the customer service representative via the telephone network 106(2) to find a remedy for an incident encountered by the client 104(n) during interaction with the web content 204(k). The customer service representative may then enter a report ID received from the client 104(n) over the telephone network 106(2) into the output module 128 via a report user interface (UI) 240. The output module 128 may then retrieve one of the plurality of reports 122(j) from the report provider via the reporting API 238. The retrieved report may then be output via the report UI 240 for viewing by the customer service representative in order to aid the client 104(n) in remedying the incident. In this way, the customer service representative may be provided with detailed information regarding the incident from a source other than the client 104(n). Further discussion of report retrieval may be found in relation to FIGS. 3 and 5.

Exemplary Procedures

The following discussion describes reporting techniques that may be implemented utilizing the previously described systems and devices, as well as in other systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
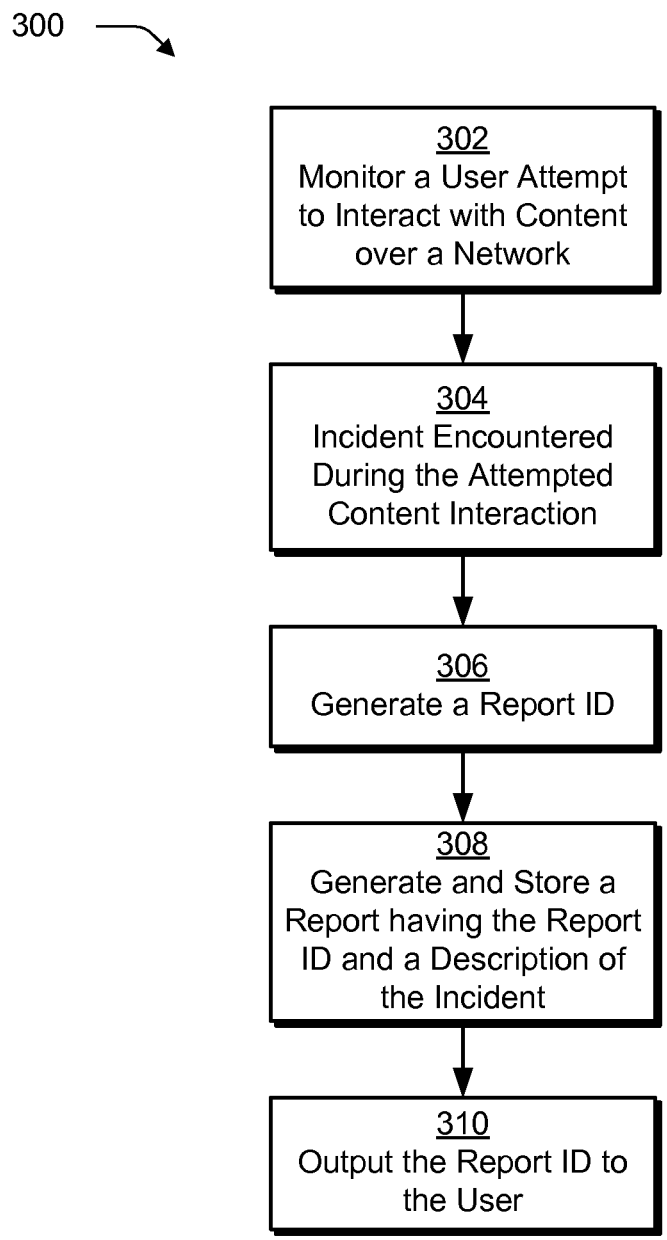
FIG. 3 is a flow diagram depicting a procedure in an exemplary implementation in which a report is generated having a report ID which is communicated to a user to retrieve the report.

FIG. 3 is a flow diagram depicting a procedure 300 in an exemplary implementation in which a report is generated having a report ID which is communicated to a user to retrieve the report. A user attempt to interact with content over a network is monitored (block 302). The monitoring may be performed in a variety of ways. For example, a module may be executed by a content provider which monitors user interaction with the content provided by the content provider. In another example, a module may be executed by the client that monitors user interaction with the content over a network. In a further example, a module is executed on another, stand-alone computing device to monitor the content provider, the client, and any devices which are utilized to communicatively couple the client to the content provider.

During the attempted content interaction, an incident is encountered (block 304) which affects the user's interaction with the content. For instance, a hardware, software, and/or network error may occur which causes an interruption or reduction in the client's ability to interact with the content over the network. The error may be detectable through the monitoring of the attempted user interaction (block 302).

In response to the incident, a report ID is generated (block 306). For example, the monitoring module 116(m), when executed by the content provider 102(m), may transmit data 226(m) which describes the incident (e.g., by gathering information about the client 104(n), an error which caused the incident, surrounding circumstances which may have caused the error, and so on) to the report provider 118. The report provider may then generate and store a report having the report ID and a description of the incident (block 308) obtained at least in part from the data 226(m). The report ID is also output to the user (block 310), such as directly from the report provider 118 and/or indirectly through the content provider 102(m). Thus, the report provider 118 may then act as a "ticketing" system by generating a unique identifier for identification of the report (i.e., the report ID) from a plurality of reports which are storable by the report provider 118, further discussion of which may be found in relation to FIG. 5.

Figure 4:
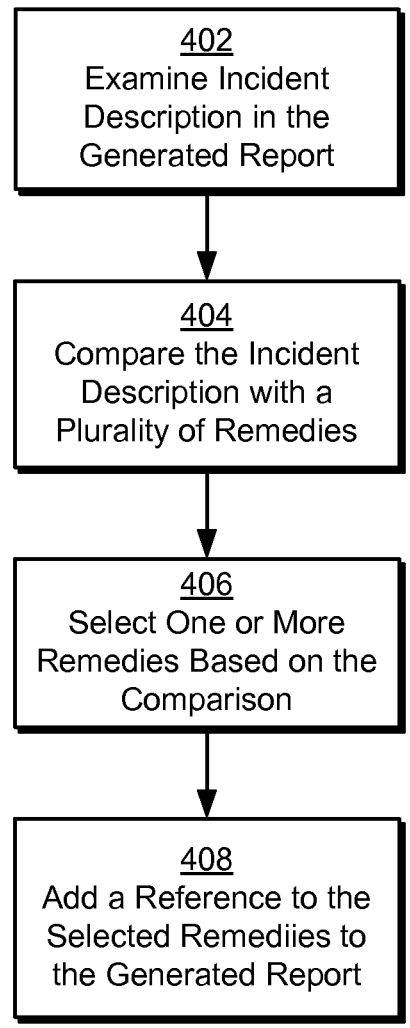
FIG. 4 is a flow diagram depicting a procedure in an exemplary implementation in which a description of an incident included in a report is examined to find a remedy to the incident.

FIG. 4 is a flow diagram depicting a procedure 400 in an exemplary implementation in which a description of an incident included in a report is examined to find a remedy to the incident. An incident description in the generated report of FIG. 3 is examined (block 402). For example, the incident description may be examined to locate characteristics of the incident, such as time (e.g., when the incident occurred), location (e.g., network address, geographical location of the incident), failure type (e.g., whether the incident relates to a hardware, software, and/or network error), request (e.g., what content was requested), a corresponding result of the request (e.g., what data was to be provided as a result to the request), data describing content interaction performed by other clients that may have caused the incident (e.g., processing performed in response to a request from another one of the plurality of clients 104(n) which caused software and/or hardware failure of the web server 202(m)), and so on. These characteristics, whether singly or in combination, may be indicative of a cause of the incident.

The incident description (and more particularly the characteristics) may then be compared with a plurality of remedies (block 404). For example, the plurality of remedies may be indexed and cross-referenced based on similar characteristics, such as time, failure type, and so on. Therefore, the characteristics of the incident may be compared to characteristics utilized to index the plurality of remedies. One or more remedies may then be selected based on the comparison (block 406). For instance, an incident description may describe a hardware error which occurred during interaction with a particular one of the plurality of web server 202(m) of the content provider 102(m). Therefore, the reporting module 120 may be executed to find one or more of the plurality of remedies 234(x), which in this instance may include a network address of another one of the plurality of web servers 202(m). A reference to the selected one or more remedies may then be added to the generated report (block 408). For example, a pointer to the remedy 234(x) may be added to the report 122(j), a description of the remedy 234(x) itself may be added to the report, and so on. Thus, the report may be further configured to include not only a description of the incident, but also a proposed remedy to the incident which may aid in "curing" the incident, such as an error which caused the incident. Further discussion of use of the proposed remedy may be found in relation to the following figure.

Figure 5:
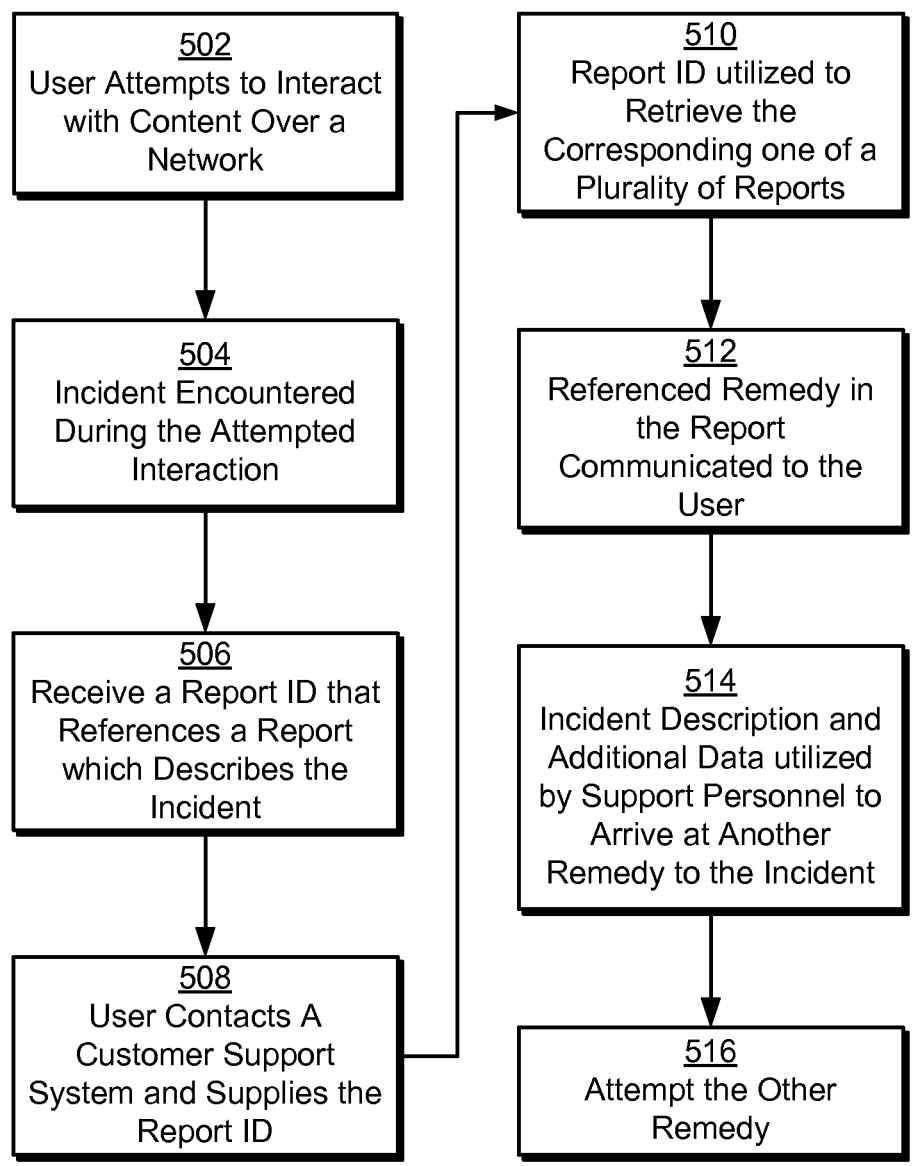
FIG. 5 is a flow diagram depicting a procedure in an exemplary implementation in which an incident report which includes a reference to a proposed remedy to the incident is retrieved through use of the report ID which was communicated to the user.

FIG. 5 is a flow diagram depicting a procedure 500 in an exemplary implementation in which an incident report which includes a reference to a proposed remedy to the incident is retrieved through use of the report ID which was communicated to the user. First, a user attempts to interact with content over a network (block 502). For example, the user may utilize a client device (e.g., a wireless phone, a desktop PC, a game console, and so on) which executes a browser to access a web page. During the attempted interaction, however, an incident is encountered (block 504) which has an effect on the user's interaction with the content.

In response to the incident, the user may receive a report ID that references a report which describes the incident (block 506). For example, a provider of the web site may communicate the report ID to the user along with a message which contains instructions on how the user may communicate with a customer service representative to remedy the incident. The message, for instance, may include the following text:

> An Error has Occurred, please contact Customer Service by Email or instant message @ customerservice@example.com, or by telephone @ 555-4357 (help) and provide the Customer Service Code: WV3 4AK H2R.

The user may then contact Customer Service using the options provided by the message, such as by calling the listed telephone, and provides the report ID (block 508). The report ID in this example is the "Customer Service Code" referenced in the above message, i.e., "WV3 4AK H2R". The customer service representative may then utilized the report ID to retrieve the corresponding one of a plurality of reports for that particular user (block 510).

As previously described in relation to FIG. 4, the report may reference a remedy. Accordingly, the referenced remedy in the report may be communicated to the user (block 512). This communication may be performed in a variety of ways. For example, the customer service representative may read the remedy over the telephone to the user, the remedy may be emailed to the user, instant messaged to the user, and so on.

The remedy, when communicated to the user, may be utilized as a "starting point" to arrive at a remedy which "cures" the incident. For example, the proposed remedy may be attempted by the user while on the phone with the customer service representative. Even if the proposed remedy fails to cure the incident (e.g., an underlying which caused the incident), the attempt may result in additional information which may be utilized to further troubleshoot the incident. For instance, another incident may be encountered during the attempt to perform the proposed remedy. In response to the other incident, another report may be generated having another report ID for communication to the user. The user may then communicate this other report ID to the customer service representative to retrieve the other report, which may include additional descriptive data that may "shed light" on an underlying cause of the incident. Therefore, this additional data may be utilized (either alone or in combination with the initial incident description in the initial report) to arrive at another remedy to the incident (block 514). The other remedy may then be attempted (block 516), and this process repeated until a functional remedy is found which cures the incident.

The referenced remedy (block 512) may also be utilized to gain additional information from the user. For example, the referenced remedy may trigger the user's memory to cause a remembrance of additional information which may be indicative of an underlying cause of the incident, such as information relating to local incidents which occurred around the user which are not included in the incident description. Thus, the referenced remedy may be utilized in a variety of ways to cure the incident.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A content interaction monitoring server system comprising:
   a processor;
   a memory;
   one or more network interfaces;
   a monitoring module, stored in the memory and executable on the processor, the monitoring module configured to detect an anomaly that affected an interaction of a user with content provided by a content provider, the interaction being performed over a network connecting a client device of the user with a server system of the content provider; and
   a reporting module, stored in the memory and executable on the processor, the reporting module configured to:
      generate a report associated with the anomaly, the report comprising a description of the anomaly;
      determine a proposed remedy to the anomaly; and
      communicate the proposed remedy to the client device,
   wherein the content interaction monitoring server system is separate and distinct from the client device.

2. A system as described in claim 1, wherein:
   the content is web content; and
   the network is the Internet.

3. A system as described in claim 1, wherein the anomaly results in an inability of the user to interact with the content.

4. A system as described in claim 1, wherein the anomaly is a result of an action by the user of the client device.

5. A system as described in claim 1, wherein the anomaly is a result of a hardware, or software error on the content provider.

6. A system as described in claim 1, wherein the anomaly is a result of a network error.

7. A system as described in claim 1, further comprising:
   receiving additional information from the user of the client device in response to communicating the proposed remedy.

8. A system as described in claim 7, further comprising:
   finding another remedy to the anomaly based at least in part on the additional information.

9. A system as described in claim 1, wherein determining a proposed remedy includes:
   comparing the description of the anomaly with a plurality of anomaly descriptions in a database to find a match; and
   retrieving one of a plurality of remedies which correspond to the matching anomaly description in the database.

10. One or more computer storage devices comprising computer executable instructions that, when executed on a computer, implement a content provider, the content provider performing operations including:
    receiving a report identifier (ID) from a client device, wherein the report ID was generated in response to detection of an anomaly that affected a user's interaction with web content provided by the content provider over an Internet, wherein the anomaly was detected by the content provider during monitoring of the user's interaction with the web content by the content provider; and utilizing the received report ID to retrieve one or more of a plurality of reports that include a description of the user's interaction with the web content that caused the anomaly, wherein the computer is separate and distinct from the client device.

11. One or more computer storage devices as described in claim 10, wherein:

the anomaly results in an inability of the user to interact with the web content; and the anomaly is a result of a hardware, software, user, or network error.

12. One or more computer storage devices as described in claim 10, wherein the retrieved one or more reports include a proposed remedy to the anomaly.

13. One or more computer storage devices as described in claim 12, wherein the operations further include:

communicating the proposed remedy to the user;

receiving additional information from the user in response to the communicating; and finding another remedy to the anomaly based at least in part on the additional information.

14. A method comprising:

receiving, by a content provider, a report identifier (ID), wherein the report ID was generated in response to detection of an anomaly that affected a user's interaction with web content provided by the content provider over an Internet, wherein the anomaly was detected by the content provider during monitoring of the user's interaction with the web content by the content provider; and utilizing, by the content provider, the received report ID to retrieve one or more of a plurality of reports that include a description of the user's interaction with the web content that caused the anomaly.

15. A method as described in claim 14, wherein:

the anomaly results in an inability of the user to interact with the web content; and the anomaly is a result of a hardware, software, user, or network error.

16. A method as described in claim 14, wherein the retrieved one or more reports include a proposed remedy to the anomaly.

17. A method as described in claim 16, further comprising:

communicating the proposed remedy to the user;

receiving additional information from the user in response to the communicating; and finding another remedy to the anomaly based at least in part on the additional information.

18. One or more computer readable storage media comprising computer executable instructions that, when executed on a computer, direct the computer to perform the method as recited in claim 14.

* * * * *